United States Patent [19]

Kleinschmidt

[11] 4,179,525

[45] Dec. 18, 1979

[54] METHODS FOR FORMING STABLE DISPERSIONS OF GLUTENS WHICH TEND TO AGGLOMERATE

[75] Inventor: Albert W. Kleinschmidt, Park Forest, Ill.

[73] Assignee: J. R. Short Milling Company, Chicago, Ill.

[21] Appl. No.: 915,583

[22] Filed: Jun. 15, 1978

Related U.S. Application Data

[63] Continuation of Ser. No. 705,838, Jul. 16, 1976, abandoned.

[51] Int. Cl.$^2$ ............................. A21D 2/36; A23J 3/00
[52] U.S. Cl. ................................. 426/19; 426/21; 426/23; 426/583; 426/656; 426/653; 260/112 G
[58] Field of Search ................. 426/19, 21, 23, 41, 426/42, 96, 103, 285, 289, 453, 583, 653, 656, 506, 99; 260/112 G

[56] References Cited

U.S. PATENT DOCUMENTS

| | | | |
|---|---|---|---|
| 2,819,970 | 1/1958 | Steigmann | 426/99 |
| 3,102,031 | 8/1963 | MacAllister et al. | 426/656 X |
| 3,348,951 | 10/1967 | Evans | 426/21 |
| 3,362,829 | 1/1968 | Landfried et al. | 426/99 |
| 3,463,770 | 8/1969 | Fellers | 426/656 X |
| 3,506,448 | 4/1970 | Kleinschmidt et al. | 426/99 X |
| 3,704,131 | 11/1972 | Hampton et al. | 426/252 X |
| 3,880,824 | 4/1975 | Rao et al. | 426/656 X |
| 3,925,343 | 12/1975 | Hampton et al. | 426/653 X |

*Primary Examiner*—Raymond N. Jones
*Assistant Examiner*—Esther M. Kepplinger
*Attorney, Agent, or Firm*—Roylance, Abrams, Berdo & Farley

[57] ABSTRACT

An inherent tendency for particulate wheat gluten to agglomerate when introduced into an aqueous medium is inhibited by mixing the gluten with an edible material, which is rich in protein capable, when interposed between the gluten particles, of interfering with and preventing the hydrogen bonding between protein molecules of the gluten which would otherwise cause the gluten particles to agglomerate. Soy flour is particularly effective as the agglomeration-inhibiting additive and can be introduced by pre-mixing with the gluten. The invention is particularly useful in inhibiting agglomeration of vital wheat gluten in the production of yeast-leavened baked goods.

12 Claims, No Drawings

METHODS FOR FORMING STABLE DISPERSIONS OF GLUTENS WHICH TEND TO AGGLOMERATE

This is a continuation of U.S. application Ser. No. 705,838 filed July 16, 1976, now abandoned.

BACKGROUND OF THE INVENTION

Wheat gluten in powdered form has long been used in the food industries, particularly to supplement the normal protein content of flour in the production of yeast-leavened baked goods, and also to strengthen and improve alimentary products such as macaroni. In most such uses, and in other uses outside the food industry, it is necessary or desirable to disperse the gluten in an aqueous medium. Wheat glutens, and particularly the undenatured or so-called "vital" wheat glutens employed in the production of baked goods, exhibit a marked tendency to agglomerate when introduced into an aqueous medium at or near neutral pH, and dispersions of what gluten thus are unduly difficult to prepare and not adequately uniform.

Prior-art workers have proposed a number of ways to inhibit or reduce the tendancy of particulate protein materials to agglomerate when introduced into an aqueous liquid. One approach, disclosed in U.S. Pat. Nos. 2,819,970, issued to Albert E. Steigmann, and 3,362,829, issued to Bert W. Landfried et al, involves coating the particles of gluten or the like to both prevent agglomeration and increase dispersibility. A second approach, disclosed in U.S. Pat. No. 3,704,131, issued to Hampton et al, includes fluidized bed agglomeration of powdered gluten to produce irregular agglomerates said to be readily dispersible.

Prior-art methods for inhibiting agglomeration of wheat gluten by coating the gluten particles have achieved considerable success in the production of bread, rolls and other yeast-leavened baked goods, but the necessity for coating the gluten has increased the effective cost of the gluten to the baker. There has accordingly been a continuing need for an effective but less expensive solution to the problem of inhibiting agglomeration.

OBJECTS OF THE INVENTION

A general object of the invention is to provide an improved and more economical method for producing stable aqueous dispersions of wheat gluten.

Another object is to provide particulate gluten compositions from which stable dispersions in aqueous media can be prepared.

A further object is to render gluten non-agglomerating without use of such relatively expensive expedients as coating the gluten particles.

Yet another object is to provide a method for producing yeast-leavened baked goods including vital wheat gluten, the method being such as to achieve the advantages heretofore obtained only with specially coated glutens.

SUMMARY OF THE INVENTION

Stated generally, wheat glutens which tend to agglomerate excessively when dispersed in aqueous media are rendered non-agglomerating according to the invention by use of a finely particulate edible additive rich in protein which, when physically interposed between particles of gluten in the aqueous dispersion, interfere with and prevent the hydrogen bonding between the molecules of the protein of the gluten which would otherwise occur and cause agglomeration. Advantageously, the agglomeration-inhibiting additive is a finely particulate edible vegetable material having a substantial content of globular protein in undenatured form, typically a legume flour which has been produced under conditions which do not denature the native protein content of the flour. Soy flour in which the soy protein is undenatured is particularly advantageous. The gluten to be dispersed is employed in finely particulate form, with the average maximum particle dimension not exceeding 350 microns, and the agglomeration inhibiting additive is of a particle size such that the average maximum particle dimension does not exceed the same value. Though the additive can be introduced separately into the aqueous medium in which the gluten is, or is to be, dispersed, it is most advantageous to pre-mix the additive with the gluten to be rendered non-agglomerating, the dry admixture being dispersed in the aqueous medium in conventional fashion.

DETAILED DESCRIPTION OF THE INVENTION

The invention is applicable to any finely particulate gluten which tends to agglomerate excessively when dispersed in aqueous media, and is particularly useful in connection with vital wheat gluten. The invention stems from the initial discovery that vital wheat gluten, exhibiting by itself an excessive tendency to agglomerate when agitated in an aqueous liquid, is readily dispersible in water when pre-mixed with a soy flour, the protein content of which has not been denatured, while pre-mixing with a soy flour treated to denature the soy protein failed to reduce agglomeration. The same results are achieved with peanut flour, navy bean flour, lentil flour, cottonseed flour and rapeseed flour, so long as the protein thereof is undenatured, as well as with the proteins isolated or concentrated in undenatured form from such materials. When the aqueous medium in which the gluten is to be dispersed does not contain a substantial amount of salt, the same results are also obtainable with dairy whey solids. Though higher proportions of the additive material can be employed without serious disadvantage other than lack of economy, best results are achieved when the soy flour or other agglomeration-inhibiting additive is included in an amount equal to 3-15% by weight, based on the total weight of the gluten and the agglomeration-inhibiting additive.

It is of particular importance, especially when the protein material to be rendered non-agglomerating is vital wheat gluten, to employ that material in a particle size such that the average maximum particle dimension does not exceed 350 microns. When the particle size of the gluten is significantly larger, the effect of the soy flour or like proteinaceous additive in preventing agglomeration of the gluten is markedly reduced. It is advantageous to employ the gluten to be dispersed in a particle size such that most of the gluten has a maximum particle dimension smaller than 150 microns and no substantial proportion thereof has a maximum particle dimension larger than 350 microns. The average maximum particle dimension of the soy flour or other agglomeration-inhibiting additive should not exceed 350 microns in all events and, advantageously, is made to approximate that of the gluten.

In particularly advantageous embodiments of the invention, the gluten is initially dry blended with the agglomeration-inhibiting additive to provide a uniform admixture of the two particulate solid materials. Alternatively, the gluten and the agglomeration-inhibiting additive are introduced separately into the aqueous medium in which the stable dispersion is to be established.

While the invention is generally applicable to all procedures requiring establishment of a stable aqueous dispersion of gluten, it offers special advantages when applied to the problems presented by use of vital wheat gluten as an additive in the production of baked goods, either by the various batch procedures or by the continuous-mix method. With batch procedures, the gluten and the agglomeration-inhibiting additive can be dispersed in all or a portion of the water for the formula or can simply be added to the mix. When the sponge-dough method is used, the gluten and agglomeration-inhibiting additive can be added to the sponge, or to the dough, i.e., the "remix", or to both. For the continuous-mix procedure or other procedures using an aqueous brew or broth, the gluten and the agglomeration-inhibiting additive can be dispersed in the water for the brew or broth, or in an amount of water held out of the brew or broth with the gluten dispersion then being added to the brew or broth at an appropriate stage. When employing the invention in connection with brews or broths containing substantial amounts of sodium chloride, more stable dispersions of the gluten in the brew or broth are obtained if the gluten and the agglomeration-inhibiting agent are first dispersed in a portion of the water for the formulation and the dispersion then added to the brew or broth, with the time of addition being so selected that at least three minutes of agitation time will still be available after the dispersion is added. Use of dairy whey solids is avoided when the brew or broth contains a substantial proportion of salt.

The following examples are illustrative:

EXAMPLE 1

Using a Waring blender, 200 ml of water was introduced into the bowl of the blender, 25 g of NEW ERA vital wheat gluten was added, and the wheat gluten was dispersed by operating the blender for 1 minute. The gluten agglomerated after the dispersion had stood at room temperature for only 30 minutes. The NEW ERA vital wheat gluten employed was finely particulate, having the following particle size distribution:

| Percent by wt. | Particle size (microns) |
| --- | --- |
| 0 | larger than 350 |
| 2 | 300–350 |
| 12 | 210–300 |
| 18 | 149–210 |
| 16 | 105–149 |
| 52 | smaller than 105 |

EXAMPLE 2

Twenty five grams of full fat enzymatically active soy flour and 225 g of the same vital wheat gluten employed in Example 1 were placed in a glass jar and tumble-blended by hand for 15 minutes. Using a Waring blender, 25 g of the resulting mixture and 200 ml water were combined in the bowl and mixed for 1 minute. The resulting dispersion was allowed to stand at room temperature for observation. After 7 hours, no significant agglomeration or settling could be observed.

EXAMPLE 3

Using a Waring blender, 200 ml water was placed in the bowl, 25 g of full fat enzymatically active soy flour was added, and the blender then operated for 1 minute to disperse the soy flour. Two hundred and twenty five grams of the vital wheat gluten of Example 1 was then added and the blender again operated for 1 minute to disperse the gluten. The resulting dispersion was set aside at room temperature for observation. No agglomeration or settling had occurred at the end of 7 hours. The procedure was repeated, except that the vital wheat gluten was dispersed in the water before the soy flour. Again, no agglomeration or settling was observed at the end of 7 hours.

EXAMPLE 4

Following the same procedure set out in Example 2, three samples were prepared with the following formulations:

| Ingredient | Weight in grams | | |
| --- | --- | --- | --- |
| | Sample A | Sample B | Sample C |
| Vital wheat gluten of Example 1 | 243.75 | 237.50 | 231.25 |
| Full fat enzymatically active soy flour | 6.25 | 12.50 | 18.75 |
| | 250.00 | 250.00 | 250.00 |

Twenty five grams of each sample was combined with 200 ml water and each sample was dispersed in its volume of water by manual agitation with a stirring rod. The resulting dispersions were set aside at room temperature for observation. For Sample A, agglomeration and settling were observable at between 2 and 3 hours. For Samples B and C, no agglomeration or settling were observable at the end of 7 hours.

EXAMPLE 5

Using the same vital wheat gluten as in Example 1, a control dispersion was prepared by stirring 25 g of the gluten into 200 ml of water, using a stirring rod. Following the procedure of Example 2, three samples were prepared with the following formulations:

| Ingredient | Weight in grams | | |
| --- | --- | --- | --- |
| | Sample D | Sample E | Sample F |
| Vital wheat gluten of Example 1 | 237.50 | 231.25 | 225.00 |
| NUTRISOY[1] soy flour | 12.50 | 18.75 | 25.00 |
| | 250.00 | 250.00 | 250.00 |

[1]Low fat soy flour sold by Archer Daniels Midland Co., Decatur Illinois; containing 0.9% fat, 6% moisture, 58% (dry basis) protein, by weight, the protein of the soy flour being essentially non-denatured. All particles smaller than 250 microns, average maximum particle dimension smaller than 150 microns.

Using a stirring rod, each of the three samples was dispersed in 200 ml water. The four dispersions were set aside at room temperature for observation. For the control, extensive agglomeration and settling were observable within 2 hours. In Sample D, commencement of agglomeration was observed after 5 hours, but the dispersion was still judged to be pumpable after 7 hours. No agglomeration or settling was observable in Sample E after 7 hours. No agglomeration or settling was observable in Sample F after 24 hours.

EXAMPLE 6

Following the procedure of Example 2, 225 g of MANILDRA vital wheat gluten was dry blended with 25 g of full fat enzymatically active soy flour to provide Sample G. As compared to the wheat gluten of Example 1, the MANILDRA gluten was relatively coarse, having the following particle size distribution:

| Percent by wt. | Particle size (microns) |
|---|---|
| 36 | larger than 350 |
| 8 | 300–350 |
| 6 | 210–300 |
| 6 | 149–210 |
| 12 | 105–149 |
| 32 | smaller than 105 |

Sample H was prepared by blending 225 g of the wheat gluten of Example 1 with 25 g of soy flour in which the protein was essentially undenatured, blending being carried out as in Example 2. Sample J was prepared by first sifting the above-described MANILDRA gluten through a No. 70 U.S. Standard sieve and then blending 225 g of the finer fraction of that gluten with 25 g of the same soy flour employed for Sample H, the gluten of Sample J thus all being finer than 210 microns.

Four brews suitable for producing white bread by the continuous-mix process were prepared according to the following formulation:

| Ingredient | Weight (grams) |
|---|---|
| Stage I (Start) | |
| Water | 610.00 |
| XPANDO[2] | 2.03 |
| WYTOLA[3] | 8.54 |
| Potassium bromate | 0.0128 |
| Ammonium sulfate | 0.4138 |
| Stage 2 (Set) | |
| Glucose | 12.20 |
| Yeast | 10.17 |
| Stage 3 (Spike) | |
| Salt | 21.15 |
| VERV[4] | 2.85 |
| Sodium propionate mold inhibitor | 0.81 |
| Glucose | 65.00 |
| Yeast | 10.17 |
| Potassium bromate | 0.064 |

[2]A dough conditioner comprising mono- and diglycerides and ethexylated monoglyceride, supplied by Breddo Food Products, Kansas City, Kansas.
[3]A dough conditioner comprising lipoxidase and an enzymeperoxidizable fat supplied by J.R. Short Milling Co., Chicago, Illinois.
[4]A dough conditioner comprising calcium stearoyl-2-lactylate and sodium stearoyl-2-lactylate, supplied by Patco Products Division, C.J. Patterson Co., Kansas City, Missouri.

Mixing is carried out for 30 minutes at 76° F. in Stage 1. Stage 2 allows fermentation for 45 minutes. Stage 3 allows fermentation of 1 hour at 80°–81° F., at the end of which time the brew is to be supplied to the preliminary mixer of the continuous-mix dough producing apparatus. Agitation is carried out throughout Stages 2 and 3.

For one of the four brews, 9.15 g of Sample G was dispersed in 50 g of the water for the Stage 3 and the dispersion was added to the brew at the beginning of that stage. Sample H and Sample J were dispersed and added to the second and third brews, respectively, in precisely the same fashion as for Sample G. For the fourth brew, 9.15 g of a dispersible vital wheat gluten product sold commercially by Breddo Food Products Corp., Kansas City, Kansas, as MG 100, and described as being in accordance with the aforementioned Landfried et al U.S. Pat. No. 3,362,829 was added in precisely the same fashion as for Sample G. At the end of Stage 3, each brew was passed through a No. 18 U.S. Standard sieve to remove any agglomerated particles. For the brews made with the Breddo MG 100 product, Sample H and Sample J, the screenings each provided only approximately 0.75 g of solids. For the brew prepared with Sample G, the screening step provided approximately 2.5 g of solids. In each case, the solids collected on the sieve were predominantly agglomerated gluten. The 0.75 g amounts are considered acceptable. The 2.5 g amount is excessive.

This Example demonstrates that the procedure of the invention inhibits agglomeration of the gluten fully as well as does the coating procedure described in the aforementioned Landfried et al U.S. Pat. No. 3,362,829, and also demonstrates the criticality of employing the gluten of this invention in such finely particulate form that the average maximum particle dimension does not exceed 350 microns.

EXAMPLE 7

The procedure of Example 6 was repeatd with two brews, using Sample H of Example 6 for one brew and the Breddo MG 100 product for the other. In each case, the gluten material was pre-dispersed in 50 ml of water held out of the formulation for Stage 3 and the dispersion was added 2 minutes before the completion of Stage 3. In each case, an excessive amount of gluten was retained on the sieve, demonstrating that a longer mixing time, typically at least 3 minutes, is necessary to accomplish adequate dispersion of the gluten through the brew liquid, and that it is advantageous to add the gluten material at the start of Stage 3.

EXAMPLE 8

Proceeding as in Example 6, preparations identical to Sample H of that Example were tested in a commercial continuous-mix bakery against the Breddo MG 100 product, in the production of white bread. The bread produced by the use of Sample H was judged to be equally as good as the bread produced with the Breddo MG 100 product.

EXAMPLE 9

Pea flour was prepared by grinding dried split green peas in a Quaker mill adjusted to yield a rather coarse meal and then passing the meal through a No. 40 U.S. Standard sieve to obtain a flour no particles of which were larger than 420 microns, the average maximum particle dimension being smaller than 210 microns. Grinding of the peas was carefully done to avoid generation of such heat as would denature the pea protein. The pea flour so obtained analyzed as follows:

| | Percent by wt.[6] |
|---|---|
| Moisture | 11.80 |
| Fat | 1.07 |
| Protein[7] | 22.09 |
| Ash | 2.20 |

[6]As is basis
[7]Nitrogen multiplied by 6.00

One sample of the pea flour was blended with NEW ERA vital wheat gluten having the characteristics set out in Example 1, and a second sample of the pea flour was blended with the MANILDRA vital wheat gluten referred to in Example 6, that relatively coarse gluten having been passed through a No. 40 U.S. Standard sieve to provide a gluten of approximately the same average particle size as the pea flour. Both mixtures consisted of 90% by weight gluten and 10% by weight pea flour. For use as control, a third dry blend was prepared according to Example 2, the control blend thus consisting of 90% by weight of the NEW ERA gluten and 10% full fat enzymatically active soy flour.

Three brews suitable for the production of white bread were prepared according to Example 6 and the three gluten blends were tested for agglomeration following the procedure of that example. The gluten-pea flour blends were observed to have a non-agglomerating characteristic slightly superior to that of the gluten-soy flour control.

EXAMPLE 10

The procedure of Example 9 was repeated, using navy bean flour in place of the pea flour. The navy bean flour was prepared in the same manner as the pea flour. The gluten-navy bean flour blends were observed to be equally as free from agglomeration as was the gluten-soy flour control blend. Analysis of the navy bean flour, on the same basis as for the pea flour of Example 9, was as follows:

|  | Percent by wt. |
|---|---|
| Moisture | 13.33 |
| Fat | 1.70 |
| Protein | 20.66 |
| Ash | 3.30 |

EXAMPLE 11

The procedure of Example 9 was repeated, substituting defatted peanut flour for the pea flour, the peanut flour being prepared as was the pea flour except that the raw peanuts were first extracted with hexane. The gluten-peanut flour blends were equal to the gluten-soy flour control blend so far as freedom from agglomeration was concerned. Analysis of the peanut flour, on the same basis as for the pea flour of Example 9, was as follows:

|  | Percent by wt. |
|---|---|
| Moisture | 10.70 |
| Fat | 0.30 |
| Protein | 51.74 |
| Ash | 8.70 |

EXAMPLE 12

The procedure of Example 9 was repeated, substituting commercial rapeseed flour for the pea flour. The gluten-rapeseed flour blends were observed to be inhibited against agglomeration to approximately the same extent as was the gluten-soy flour control blend. Analysis of the commercial rapeseed flour, on the same basis as in Example 9, was as follows:

|  | Percent by wt. |
|---|---|
| Moisture | 7.50 |
| Fat | 4.19 |
| Protein | 51.74 |
| Ash | 8.70 |

The rapeseed flour was screened and only that portion passing a No. 40 U.S. Standard sieve was employed. As used, the rapeseed flour had the following particle size distribution:

| Percent by wt. | Particle size (microns) |
|---|---|
| 0 | larger than 420 |
| 2 | 297–420 |
| 26 | 177–297 |
| 2 | 149–177 |
| 18 | 105–149 |
| 52 | smaller than 105 |

EXAMPLE 13

The procedure of Example 9 is repeated, substituting commercial detoxified cottonseed flour for the pea flour, with the cottonseed flour being all finer than 420 microns and having an average maximum particle dimension smaller than 210 microns, the gluten-cottonseed flour blends being inhibited against agglomeration of the gluten to approximately the same extent as with the gluten-soy flour control.

EXAMPLE 14

The procedure of Example 9 was repeated, substituting commercial spray dried dairy whey solids for the pea flour and using water containing no significant proportion of sodium chloride other than that introduced by the dairy whey solids. The dairy whey solids were sieved with a No. 80 U.S. Standard sieve, and only the smaller fraction, consisting of particles smaller than 177 microns, was employed. The gluten-whey solids blends were observed to be as inhibited against agglomeration as the gluten-soy flour control.

What is claimed is:

1. The method for producing stable aqueous dispersions of particulate wheat gluten, comprising
    providing the gluten in finely particulate form such that the average maximum particle size thereof does not exceed 350 microns;
    dispersing the gluten in the aqueous medium; and
    also maintaining dispersed in the aqueous medium a finely particulate agglomeration-inhibiting additive which is rich in protein and contains a substantial proportion of native globular protein in at least substantially undenatured form,
    said particulate additive being present in an amount equal to at least 3% by weight based on the combined weight of the gluten and said additive but substantially smaller than the amount of gluten and having an average maximum particle dimension not exceeding 350 microns,
    particles of said additive interposing between particles of the gluten in the dispersion, and the presence of said globular protein in said additive inhibiting hydrogen bonding between the gluten particles which would otherwise cause the gluten to agglomerate.

2. The method defined in claim 1, wherein the average maximum particle dimension of the gluten does not exceed 150 microns and no substantial proportion thereof has a maximum particle dimension larger than 350 microns.

3. The method defined in claim 1, wherein
dispersion of the gluten and dispersion of the agglomeration-inhibiting additive are accomplished by adding to the aqueous medium a dry blend of the gluten and the additive and agitating the aqueous medium.

4. The method defined in claim 3, wherein
said dry blend contains 3–15 parts by weight of the additive and 97–85 parts by weight of the gluten.

5. The method defined in claim 4, wherein
the gluten is vital wheat gluten; and
the average maximum particle dimension of the gluten does not exceed 150 microns and no substantial proportion thereof has a maximum particle dimension larger than 350 microns.

6. The method defined in claim 1, wherein
the agglomeration-inhibiting additive is at least one material selected from the group consisting of soy flour, pea flour, navy bean flour, lentil flour, cottonseed flour and rapeseed flour.

7. The method defined in claim 6, wherein
the gluten is vital wheat gluten; and
the average maximum particle dimension of the gluten does not exceed 150 microns and no substantial proportion thereof has a maximum particle dimension larger than 350 microns.

8. The method defined in claim 7, wherein
dispersion of the gluten and dispersion of the agglomeration-inhibiting additive are accomplished by adding to the aqueous medium a dry blend of the gluten and the additive and agitating the aqueous medium for at least 3 min. to disperse the gluten and the additive.

9. The method defined in claim 1, wherein
the aqueous medium is substantially salt-free and the agglomeration-inhibiting additive is dairy whey solids.

10. In the production of yeast-leavened baked goods by the method comprising preparing an aqueous brew, fermenting the brew while agitating the same, and then combining the brew with other ingredients to form a dough, the improvement comprising
dispersing in a part of the water for the brew both vital wheat gluten in finely particulate form and a finely particulate edible agglomeration-inhibiting additive which is rich in protein and contains a substantial proportion of native globular protein in at least substantially undenatured form,
the particles of said wheat gluten being free of agglomeration-inhibiting coating material,
said agglomeration-inhibiting additive being present in an amount which is substantially smaller than the amount of gluten but which is equal to at least 3% of the combined weight of the glutens and agglomeration-inhibiting additive,
both the gluten and the agglomeration-inhibiting agent having an average maximum particle size not exceeding 350 microns; and
incorporating the resulting dispersion in the brew at a time not later than 3 minutes before the end of the final period during which the brew is being agitated.

11. The improvement defined in claim 10, wherein
the average maximum particle dimension of the gluten does not exceed 150 microns and no substantial proportion thereof has a maximum particle size larger than 350 microns.

12. The improvement defined in claim 11, wherein
the agglomeration-inhibiting additive is at least one material selected from the group consisting of soy flour, pea flour, navy bean flour, lentil flour, cottonseed flour and rapeseed flour.

* * * * *